United States Patent [19]

Walsh et al.

[11] Patent Number: 5,609,806
[45] Date of Patent: Mar. 11, 1997

[54] METHOD OF MAKING PREPREG

[75] Inventors: Sean P. Walsh, Carrboro; Nelson H. Douglass, Garner, both of N.C.

[73] Assignee: Reichhold Chemicals, Inc., Durham, N.C.

[21] Appl. No.: 267,862

[22] Filed: Jun. 28, 1994

[51] Int. Cl.$^6$ .................................................. B29C 67/00
[52] U.S. Cl. .......................... 264/136; 264/137; 156/180; 156/275.5
[58] Field of Search ................................ 156/180, 275.5; 264/137, 136

[56] References Cited

U.S. PATENT DOCUMENTS

| | | | |
|---|---|---|---|
| 3,535,403 | 10/1970 | Holub et al. | 260/837 |
| 3,650,864 | 3/1972 | Goldsworthy | 156/85 |
| 3,700,752 | 10/1972 | Hutchinson | 260/859 |
| 3,721,643 | 3/1973 | Vargui et al. | 260/40 |
| 3,742,086 | 6/1973 | Epel et al. | 260/836 |
| 3,886,229 | 5/1975 | Hutchinson et al. | 260/859 |
| 3,892,819 | 7/1975 | Najvar | 260/836 |
| 3,959,209 | 5/1976 | Lake | 260/40 |
| 4,062,826 | 12/1977 | Hutchinson et al. | 260/40 |
| 4,067,845 | 1/1978 | Epel et al. | 260/40 |
| 4,110,120 | 8/1978 | Rosenberg et al. | 106/99 |
| 4,252,696 | 2/1981 | McQuarrie | 260/16 |
| 4,296,020 | 10/1981 | Magrans, Jr. | 260/37 |
| 4,301,201 | 11/1981 | Stout | 428/36 |
| 4,394,338 | 7/1983 | Fuwa | 264/135 |
| 4,427,482 | 1/1984 | Yamada et al. | 156/307.3 |
| 4,445,957 | 5/1984 | Harvey | 156/180 |
| 4,495,017 | 1/1985 | Abe et al. | 156/181 |
| 4,564,540 | 1/1986 | Davies et al. | 428/34 |
| 4,598,457 | 7/1986 | Kiwak et al. | 29/411 |
| 4,605,254 | 8/1986 | Carmien | 294/57 |
| 4,612,744 | 9/1986 | Shamash | 52/220 |
| 4,620,401 | 11/1986 | L'Espérance et al. | 52/309 |
| 4,725,491 | 2/1988 | Goldfein | 428/312 |
| 4,812,343 | 3/1989 | Kiekhaefer et al. | 428/35.6 |
| 4,820,366 | 4/1989 | Beever et al. | 156/166 |
| 4,861,621 | 8/1989 | Kanzaki | 427/54.1 |
| 4,892,600 | 1/1990 | Drain et al. | 428/34.5 |
| 4,892,764 | 1/1980 | Drain et al. | 428/34.5 |
| 4,894,190 | 1/1990 | Kromrey | 264/22 |
| 4,935,279 | 6/1990 | Perko et al. | 428/74 |
| 4,958,961 | 9/1990 | Herbst et al. | 405/260 |
| 5,015,514 | 5/1991 | Rinehart | 428/36.4 |
| 5,077,113 | 12/1991 | Kakihara et al. | 428/108 |
| 5,077,326 | 12/1991 | Shibata et al. | 523/523 |
| 5,084,222 | 1/1992 | Glemet et al. | 264/136 |
| 5,098,496 | 3/1992 | Breitigam et al. | 156/180 |
| 5,100,738 | 3/1992 | Graf | 428/613 |
| 5,114,516 | 5/1992 | Pilling et al. | 156/180 |
| 5,120,380 | 6/1992 | Strachan | 156/164 |
| 5,122,417 | 6/1992 | Murakami et al. | 428/371 |
| 5,127,954 | 7/1992 | Johnston et al. | 106/644 |
| 5,139,843 | 8/1992 | Murakami et al. | 428/116 |
| 5,139,845 | 8/1992 | Beckerman et al. | 428/117 |
| 5,152,945 | 10/1992 | Thictherner et al. | 264/136 |
| 5,166,230 | 11/1992 | Stecker | 523/500 |
| 5,174,844 | 12/1992 | Tong | 156/180 |
| 5,183,694 | 2/1993 | Webb | 428/67 |
| 5,200,261 | 4/1993 | Taguchi et al. | 428/245 |
| 5,202,366 | 4/1993 | Reid et al. | 523/516 |
| 5,211,669 | 5/1993 | Bonnes et al. | 16/110 |
| 5,212,234 | 5/1993 | Van Gasse et al. | 525/43 |
| 5,234,333 | 8/1993 | Rhodes, Jr. et al. | 425/391 |
| 5,246,983 | 9/1993 | Shibata et al. | 523/219 |
| 5,271,193 | 12/1993 | Olsen et al. | 52/19 |
| 5,290,407 | 3/1994 | Syrett et al. | 204/147 |

FOREIGN PATENT DOCUMENTS

0206134A3  12/1986  European Pat. Off. .

Primary Examiner—Christopher Raimund
Attorney, Agent, or Firm—Bell, Seltzer, Park & Gibson

[57] ABSTRACT

A formable prepreg, and a method of making a formable prepreg by a pultrusion process. The method includes (a) impregnating reinforcing fiber with a thermosetting resin matrix, and (b) passing the resin impregnated reinforcing fiber through a die within which the resin impregnated reinforcing fiber is subjected to conditions sufficient to thicken the thermosetting resin matrix, to provide a formable prepreg. The present invention also provides a method of making a molded article using the prepreg of the present invention.

29 Claims, No Drawings

METHOD OF MAKING PREPREG

FIELD OF THE INVENTION

The present invention relates to reinforced resin technology, and particularly to a method of making prepreg.

BACKGROUND OF THE INVENTION

Prepreg is a composite consisting of fiber reinforcements preimpregnated with resin, which is typically molded with pressure or vacuum to provide a variety of molded articles. Prepregs have applications in aerospace, transportation, appliances, sanitary ware, and the like.

Various techniques for making prepreg are well known. For example, U.S. Pat. No. 4,495,017 to Abe et al. proposes a process for continuous production of prepreg sheets. The process involves contacting fiber bundles with a solvent and continuously taking up the individual fiber bundle units under tension over curved surfaces of spreader bodies, thereby spreading out and drying the fiber bundles. According to this method, the fiber bundles are spread with a solvent prior to being impregnated with a resin. U.S. Pat. No. 3,959,209 to Lake proposes a curable solid polyester resin prepared by mixing a polyester and crosslinking agent with one or more of a filler, fibrous reinforcements or amorphous polyester. U.S. Pat. No. 4,892,764 to Drain et al. also proposes fiber/resin matrices and a method for making them. Drain et al. proposes a method of making a filament wound article including rotating a mandrel, impregnating a winding filament with a resin composition comprising an actinic radiation-cured first resin component and a curable second resin component, filament winding the mandrel, exposing the wound filament to actinic radiation contemporaneously with filament winding, terminating the rotation of the mandrel, and curing the second resin component.

Although several means of producing formable prepreg have been proposed, there remains a need in the art for a method of preparing continuous prepreg which is faster than conventional methods and can be automated. Conventional forms of prepreg include sheet molding compound (SMC), which typically requires extensive manual labor in preparation and final molding. Additionally, SMC produces waste in the form of carrier film, and trim waste produced by cutting the SMC into desired shapes. Accordingly, there is also a need in the art for a method of making prepreg which reduces the amount of waste produced by conventional techniques.

In addition, there is a need in the art for a method of preparing prepreg which achieves a more efficient use of fiber reinforcements. Conventional SMC technology is limited with respect to the ability to optimize the placement of reinforcing fiber in the SMC. Accordingly there is a need in the art for a method of making prepreg which improves on efficient use of fiber reinforcements. In addition, the method of the present invention allows more reinforcements to be added to the prepreg composition than conventional methods.

There is also a need in the art for a method of preparing prepreg which permits the optimization of conditions of the method of preparing prepreg to provide a more efficient and designed product. Conventional methods of preparing prepreg permit only limited control over the conditions under which the prepreg is prepared, thus restricting the ability of the artisan to optimize the product by controlling a variety of reaction conditions. The method of the present invention, permits more thorough impregnation of the reinforcing fibers by providing the ability to apply pressure and dearation during the impregnation process. In addition, environmental conditions, such as temperature and atmosphere, can be controlled in the method of the present invention.

SUMMARY OF THE INVENTION

It is therefore an object of the present invention to provide a formable prepreg. It is a further object of the present invention to provide a method of making a formable prepreg. It is yet a further object of the present invention to provide an automated method of making a formable prepreg which reduces waste.

These and other objects, features and advantages are provided by the formable prepreg of the present invention. The term "prepreg" as used herein refers to a ready to mold composite in either rod, rope, or sheet form, which consists of reinforcing fiber impregnated with a thermosetting resin. The phrase "formable prepreg" as used herein refers to an incompletely cured prepreg which may be thermally reshaped subsequent to formation. Inasmuch as the prepreg of the present invention is only partially cured, the prepreg retains chemical reactive sites which provide improved bonding between the prepreg material and other resinous materials, such as for example, in the preparation of prepreg bars or rods clad with sheet molding compound.

The formable prepreg of the present invention comprises reinforcing fiber impregnated with a curable thermosetting resin matrix wherein the prepreg is formed by a pultrusion process. The term "thermosetting resin" as used herein refers to resins which irreversibly solidify or "set" when fully cured such that the fully cured resin cannot be post-formed.

The method of making the prepreg of the present invention comprises (a) impregnating reinforcing fiber with a thermosetting resin matrix, and (b) passing the resin impregnated reinforcing fiber through a die within which the resin impregnated reinforcing fiber is subjected to conditions sufficient to thicken the thermosetting resin matrix, to provide a formable prepreg.

The term "thicken" as used herein refers to an increase in the viscosity of the resin such that the resin is transformed from a liquid to a non-dripping paste form. The resulting paste form of the resin is typically referred to as "B-stage". The term "partially cure" as used herein refers to incompletely polymerizing the resin matrix by initiating polymerization and subsequently arresting the polymerization before the curable thermosetting resin is fully cured.

The curable thermosetting resin matrix typically comprises unsaturated polyester, phenolic, and/or vinyl ester resins. The reinforcing fiber typically comprises fiberglass roving. Additionally, the thermosetting resin matrix may also include various chemical and physical thickening agents.

As another aspect, the present invention also provides a method of making a molded article from the formable prepreg of the present invention. The method comprises (a) impregnating reinforcing fiber with a curable thermosetting resin matrix, (b) passing the resin impregnated reinforcing fiber through a die within which the resin impregnated reinforcing fiber is subjected to conditions sufficient to thicken the curable thermosetting resin matrix to provide a formable prepreg, and (c) molding the formable prepreg under conditions sufficient to cure the thickened thermosetting resin matrix, to form a molded article having a predetermined shape.

These and other objects and aspects of the present invention are explained in detail in the specification set forth below.

DETAILED DESCRIPTION OF THE INVENTION

The formable prepreg of the present invention is formed by a pultrusion process. In one embodiment, the method comprises (a) impregnating reinforcing fiber with a thermosetting resin matrix, and (b) passing the resin impregnated reinforcing fiber through a die within which the resin impregnated reinforcing fiber is subjected to conditions sufficient to thicken the thermosetting resin matrix. In operation, the method is carried out using conventional pultrusion apparatus.

Pultrusion is an automated process for manufacturing composite materials into linear, continuous, profiles having constant cross-sections. Typically, the pultrusion process begins with reinforcing fibers which are strung from creels at the beginning of the system to pullers at the end. The fibers typically pass through a resin bath where they are impregnated with resin. The resin impregnated fibers are continuously pulled through a die which typically has both cooling and heating zones, and which fashions the final shape of the profile. The heating zone of the die initiates and accelerates the polymerization of the resin and the profile exits as a hot, fully cured profile having a constant cross-section, and is cooled with the aid of ambient or forced air or cooling fluids. The pullers continuously pull the profile toward a flying cutoff saw which cuts the pultruded composite into the desired lengths.

The resin used in conventional pultrusion processes is typically a thermosetting resin which is ultimately shaped and fully cured by the die. In conventional pultrusion processes, the shaped profile cannot be reshaped after leaving the die. Hence, conventional pultruded composite articles typically exhibit the linear shape and always exhibit a constant cross-section which is fashioned by pulling the impregnated fibers through the die. Pultruded composites can be in the form of hollow or solid rod or bar stock. These pultruded composites have a variety of applications including fishing rods and electrical insulator rods. Structural profiles can also be produced by a pultrusion process. Typically, structural profiles include a combination of axial fibers and multidirectional fiber mats.

As mentioned above, the fibers may be impregnated by passing through a resin bath. This is conventionally known as a "wet-bath" pultrusion system. A second pultrusion system, effects fiber impregnation by injecting resin into the fibers from a pressurized resin holding tank.

The temperature of the die is dependent upon the thermosetting resin employed, and the rate of pultrusion, and can be determined by one skilled in the art. The rate of pultrusion through the system can range from 1 inch/minute upwards to 10 to 50 ft/min. A typical pultrusion process operates in the range of from 2 to 4 ft/min.

As summarized above, the Inventors have developed a pultrusion process which produces a formable prepreg, as opposed to a fully cured linear article. The formable prepreg of the present invention comprises reinforcing fiber impregnated with a thermosetting resin formed by a pultrusion process, wherein the resin impregnated reinforcing fiber is pultruded through a die within which the resin impregnated reinforcing fiber is subjected to conditions sufficient to thicken the thermosetting resin matrix. In one embodiment, the method of making the formable prepreg of the present invention comprises (a) impregnating reinforcing fiber with a thermosetting resin matrix, and (b) passing the resin impregnated reinforcing fiber through a die within which the resin impregnated reinforcing fiber is subjected to conditions sufficient to thicken the thermosetting resin matrix.

The reinforcing fiber of the present invention can be any reinforcing fiber conventionally known in the art. Preferably, the reinforcing fiber is adaptable to a conventional pultrusion machine. Suitable reinforcing fibers comprise fiberglass, polyester, graphite, aramid or natural fibers. The fibers may be continuous or staple fibers and may be in the form of roving or mat. Preferably, the reinforcing fiber comprises fiberglass roving.

The thermosetting resin matrix useful in the present invention comprises a thermosetting resin. Useful thermosetting resins include unsaturated polyesters, phenolics, vinyl esters, and the like and mixtures and blends thereof. Additionally, the thermosetting resins useful in the present invention may be mixed with other thermosetting or thermoplastic resins. Exemplary thermosetting resins include epoxies. Exemplary thermoplastic resins include polyvinylacetate, styrene butadiene copolymers, polymethylmethacrylate, polystyrene, cellulose acetatebutyrate, saturated polyesters, urethane-extended saturated polyesters, methacrylate-butadiene-styrene copolymers and the like.

Unsaturated polyester, phenolic and vinyl ester resins are the preferred thermosetting resins of the present invention. Suitable unsaturated polyester resins include practically any esterification product of a polybasic organic acid and a polyhydric alcohol, wherein either the acid or the alcohol, or both, provide the reactive ethylenic unsaturation. Typical unsaturated polyesters are those thermosetting resins made from the esterification of a polyhydric alcohol with an ethylenically unsaturated polycarboxylic acid. Examples of useful ethylenically unsaturated polycarboxylic acids include maleic acid, fumaric acid, iraconic acid, dihydromuconic acid and halo and alkyl derivatives of such acids and anhydrides, and mixtures thereof. Exemplary polyhydric alcohols include saturated polyhydric alcohols such as ethylene glycol, 1,3-propanediol, propylene glycol, 1,3-butanediol, 1,4-butanediol, 2-ethylbutane-1,4-diol, 1,5-pentanediol, 1,6-hexanediol, 1,7-heptanediol, 1,8-octanediol, 1,4-cyclohexanediol, 1,4-dimethylolcyclohexane, 2,2-diethylpropane-1,3 -diol, 2,2-diethylbutane-1,3-diol, 3methylpentane-1,4 -diol, 2,2-dimethylpropane-1,3-diol, 4,5-nonanediol, di ethylene glycol, triethylene glycol, dipropylene glycol, glycerol, pentaerythritol, erythritol, sorbitol, mannitol, 1,1,1-trimethylolpropane, trimethylolethane, hydrogenated bisphenol-A and the reaction products of bisphenol-A with ethylene or propylene oxide.

Unsaturated polyester resins can also be derived from the esterification of saturated polycarboxylic acid or anhydride with an unsaturated polyhydric alcohol. Exemplary saturated polycarboxylic acids include oxalic acid, malonic acid, succinic acid, methylsuccinic acid, 2,2-dimethylsuccinic acid, 2,3-dimethylsuccinic acid, hydroxylsuccinic acid, glutaric acid, 2-methylglutaric acid, 3-methylglutaric acid, 2,2-dimethylglutaric acid, 3,3-dimethylglutaric acid, 3,3-diethylglutaric acid, adipic acid, pimelic acid, suberic acid, azelaic acid, sebacic acid, phthalic acid, isophthalic acid, terephthalic acid, tetrachlorophthalic acid, tetrabromophthalic acid, tetrahydrophthalic acid, 1,2-hexahydrophthalic acid, 1,3-hexahydrophthalic acid, 1,4-hexahydrophthalic acid, 1,1-cyclobutanedicarboxylic acid and trans-1,4-cyclohexanedicarboxylic acid.

Unsaturated polyhydric alcohols which are suitable for reacting with the saturated polycarboxylic acids include ethylenic unsaturation-containing analogs of the above saturated alcohols (e.g., 2-butene-1,4-diol).

Suitable phenolic resins include practically any reaction product of a aromatic alcohol with an aidehyde. Exemplary aromatic alcohols include phenol, orthocresol, metacresol, paracresol, Bisphenol A, p-phenylphenol, p-tert-butylphenol, p-tert-amylphenol, p-tert-octylphenol and p-nonylphenol. Exemplary aldehydes include formadehyde, acetaldehyde, propionaldehyde, phenylacetaldehyde, and benzaldehyde. Particularly preferred, are the phenolic resins prepared by the reaction of phenol with formaldehyde.

Suitable vinyl ester resins include practically any reaction product of an unsaturated polycarboxylic acid or anhydride with an epoxy resin. Exemplary acids and anhydrides include (meth) acrylic acid or anhydride, α-phenylacrylic acid, α-chloroacrylic acid, crotonic acid, mono-methyl and mono-ethyl esters of maleic acid or fumaric acid, vinyl acetic acid, cinnamic acid, and the like. Epoxy resins which are useful in the preparation of the polyvinyl ester are well known and commercially available. Exemplary epoxies include virtually any reaction product of a polyfunctional halohydrin, such as epichlorohydrin, with a phenol or polyhydric phenol. Suitable phenols or polyhydric phenols include for example, resorcinol, tetraphenol ethane, and various bisphenols such as Bisphenol-A, 4,4'-dihydroxydiphenylsulfone, 4,4'-dihydroxy biphenyl, 4,4'-dihydroxydiphenylmethane, 2,2'-dihydroxydiphenyloxide, and the like.

Typically, the thermosetting resin matrix of the present invention also includes a vinyl monomer, in which the thermosetting resin is solubilized. Suitable vinyl monomers include styrene, vinyltoluene, methyl methacrylate, p-methylstyrene, divinyl benzene, diallyl phthalate and the like. Styrene is the preferred vinyl monomer for solubilizing unsaturated polyester or vinyl ester resins.

The thermosetting resin matrix typically also includes a thickening agent. Suitable thickening agents are commonly known to those skilled in the art and include, for example, crystalline unsaturated polyesters, polyurethanes, alkali earth metal oxides and hydroxides, and polyureas. Preferably, the thickening agent cooperates with the conditions within the die to thicken the thermosetting resin matrix to form the prepreg. The conditions within the die which are required to thicken the thermosetting resin matrix are dependent upon the thickening agent employed. Typically, the die comprises an entry zone, a center zone and an exit zone. At least one of the zones, and often more than one zone, is capable of being heated. Additionally, at least one of the zones and often more than one zone, is capable of being cooled. Typically cooling is accomplished using ambient or forced air, or cooling water. The conditions of the die which are required to thicken the thermosetting resin matrix are discussed in detail below, with reference to the particular thickening agent employed.

Suitable resins employing a crystalline polyester thickening agent are described in U.S. Pat. No. 3,959,209 to Lake, the disclosure of which is incorporated herein by reference in its entirety. Typically, in the embodiment of the invention wherein the thermosetting resin matrix is thickened with a crystalline polyester, the thermosetting resin matrix comprises a thermosetting resin solubilized in a vinyl monomer. The crystalline polyesters useful in the present invention are preferably ethylenically unsaturated, and react with the vinyl monomer, although saturated crystalline polyesters may also be employed.

Methods of preparing crystalline polyester are well known in the art and include polyesterifying a symmetrical, aliphatic diol with fumaric acid, alkyl esters of fumaric acid, or symmetrical saturated diacids such as terephthalic acid, isophthalic acid, and sebacic acid. Maleic anhydride or maleic acid or lower alkyl esters of maleic acid may also be used in the presence of an appropriate catalyst. Likewise, mixtures of fumaric acid or esters with maleic anhydride or maleic acid or its esters may also be used. Exemplary crystalline polyesters which may be employed in the present invention include polyfumarates of 1,6-hexanediol, neopentyl glycol, bis-(hydroxyethyl)resorcinol, ethylene glycol, 1,4-butanediol, 1,4-cyclohexanediol, 1,4-cyclohexanedimethanol or bis(hydroxyethyl)hydroquinone.

The amount of crystalline polyester added to the thermosetting resin matrix will vary depending upon the particular thermosetting resin employed. Typically, about 2 to about 80 percent by weight of crystalline polyester is required to thicken about 20 to about 98 percent by weight of a thermosetting resin.

The conditions in the die which are sufficient to thicken the thermosetting resin matrix including a crystalline polyester thickening agent typically comprise subjecting the thermosetting resin matrix to sufficient heat to thicken the thermosetting resin matrix. Typically, sufficient heat is provided by operating the die under conditions which include heating at least one zone of the die. In one preferred embodiment, the conditions within the die include maintaining the entry zone at a temperature of from about 25 to about 85° C., heating the center zone to a temperature of from about 35 to about 120° C., and maintaining the exit zone at a temperature of from about 0 to about 90° C.

The thermosetting resin matrix of the present invention may also be thickened with polyurethanes. Exemplary thermosetting resin matrices thickened with a polyurethane are described in U.S. Pat. No. 3,886,229 to Hutchinson, the disclosure of which is incorporated herein by reference in its entirety. Typically, in the embodiment of the invention wherein the thermosetting resin is thickened with a polyurethane, the thermosetting resin matrix comprises a thermosetting resin solubilized in a vinyl monomer.

The polyurethanes useful in the present invention typically comprise the reaction product of a polyol and an isocyanate compound. The polyol may be saturated or unsaturated. Exemplary saturated polyols include ethylene glycol, propylene glycol, butane-1,4-diol, pentane-1,5-diol, hexane-1,6-diol, di(ethylene glycol), and di(propylene glycol). Polymers of glycols may also be employed. Exemplary polymers include poly(ethylene glycol), poly(propylene glycol), and poly(butylene glycol) and polyols of functionality greater than two, for example, glycerol, pentaerythritol, and trialkylol alkanes, e.g., trimethylol propane, triethylol propane, tributylol propane and oxyalkylated derivatives of said trialkylol alkanes, e.g., oxyethylated trimethylol propane and oxypropylated trimethylol propane.

In the embodiment wherein the thermosetting resin is thickened with a polyurethane including an unsaturated polyol, the unsaturated polyol crosslinks the urethane groups with the ethylenically unsaturated polyester and vinyl monomer of the thermosetting resin matrix. Exemplary unsaturated polyols include polyesters, and vinyl esters. In one particularly preferred embodiment, the unsaturated polyol is a diester of propoxylated bisphenol-A.

The isocyanate compound is typically a polyisocyanate. The polyisocyanate may be aliphatic, cycloaliphatic or aromatic or may contain in the same polyisocyanate molecule aliphatic and aromatic isocyanate groups, aliphatic and cycloaliphatic isocyanate groups, aliphatic cycloaliphatic and aromatic isocyanate groups or mixtures of any two or more polyisocyanates.

Exemplary polyisocyanates include 4,4'-diphenylmethane diisocyanate, 2,4-toluene diisocyanate, 2,6-toluene diisocyanate, isophorone diisocyanates (e.g., 3-isocyanatomethyl-3,5,5-trimethylcyclohexyl isocyanate), tetramethylene diisocyanate, pentamethylene diisocyanate, hexamethylene diisocyanate and octamethylene diisocyanate, and cycloaliphatic diisocyanates (e.g., 4,4'-dicyclohexylmethane diisocyanate).

The polyurethane may be reacted with the thermosetting resin of the thermosetting resin matrix according to any method known to those skilled in the art. The amount of polyurethane added to the thermosetting resin matrix will vary depending upon the particular thermosetting resin employed. Typically, the polyurethane comprises about 1 to about 60 percent by weight of the thermosetting resin matrix.

The conditions in the die which are sufficient to thicken the thermosetting resin matrix including a polyurethane thickening agent typically comprise subjecting the thermosetting resin matrix to sufficient heat to thicken the thermosetting resin matrix. Typically, sufficient heat is provided by operating the die under conditions which include heating at least one zone of the die. In one preferred embodiment, the conditions within the die include maintaining the entry zone at a temperature of from about 10° to about 35° C., heating the center zone to a temperature of from about 30° to about 200° C., and maintaining the exit zone at a temperature of from about 0° to about 200° C.

The thermosetting resin matrix may also be thickened using alkali earth metal oxides or hydroxides. Typical thickeners of this type include calcium and magnesium oxides or hydroxides. The addition of these components to the thermosetting resin matrix transforms the liquid thermosetting resin matrix to a solid form. The amount of oxide or hydroxide employed will vary depending upon the particular thermosetting resin employed. Typically, the alkali metal oxide or hydroxide comprises about 1 to about 15 percent by weight of the thermosetting resin matrix.

The conditions in the die which are sufficient to thicken the thermosetting resin matrix including an alkali metal oxide or hydroxide typically comprise subjecting the thermosetting resin matrix to sufficient heat to thicken the thermosetting resin matrix. Typically, sufficient heat is provided by operating the die under conditions which include heating at least one zone of the die. In one preferred embodiment, the conditions within the die include maintaining the entry zone at a temperature of from about 10° to about 35° C., heating the center zone to a temperature of from about 30° to about 130° C., and maintaining the exit zone to a temperature of from about 0° to about 80° C.

The thermosetting resin matrix may also be thickened using a polyurea thickening agent. Suitable formulation of resins thickened with polyurea are described in U.S. Pat. No. 4,296,020 to Magrans, Jr., the disclosure of which is incorporated herein by reference in its entirety. Typically, in the embodiment of the invention wherein the thermosetting resin matrix is thickened with polyurea, the thermosetting resin matrix comprises a thermosetting resin solubilized in a vinyl monomer.

The polyureas useful in the present invention comprise the product of polyamines with polyisocyanates. The polyisocyanates useful in the present invention include those described above with reference to urethane thickeners.

Aliphatic, cycloaliphatic and aromatic polyamines free of ethylenic saturation are preferred polyurea precursors in that they form individual polyurea chains which are relatively cross-linked with the polymer chain formed by the copolymerization of the ethylenically unsaturated resin and monomers in solution therewith.

Aryl diamines and mixtures thereof such as metaphenylene diamine, paraphenylene diamine, naphthalene diamine, benzidene, bis)4-aminophenyl)methane, 4,4'-diaminodiphenyl sulfone and halogenated derivatives such as those containing halogen on the benzenoid ring such as 3,3'-dichlorobenzidine, bis,4-amino-2-chlorophenyl (sulfone), 4-bromo-l,3-phenylene diamine, to name a few, are operable.

Low molecular weight aliphatic and cycloaliphatic diamines are also suitably employed, such as: ethylene diamine, propylene diamine, hexamethylene diamine, trimethyl hexamethylene diamine, isophorone diamine, 1-amino-3-amino-3,5,5-trimethyl cyclohexane, hydrogenated di-(aminophenyl)methane, hydrogenated methylene dianiline, diamino methane, and hydrogenated toluene diamine. The most useful of these are those that are liquids up to 75° C. For those which are solids under these conditions, vinyl monomer solutions can be employed to form the homogeneous mix rapidly. In addition, other suitable amines include polyoxyalklene polyamines and cyanoalkylated polyoxyalklene polyamines having a molecular weight of about 190 to about 2,000 with a preferred range of about 190 to about 1,000.

These amines are described and prepared according to procedures outlined in a U.S. Pat. No. 4,296,020 to Magrans, Jr., the teachings of which are hereby incorporated by reference.

The conditions in the die which are sufficient to thicken the thermosetting resin matrix including a polyurea thickening agent typically comprise subjecting the thermosetting resin matrix to sufficient heat to thicken the thermosetting resin matrix. Typically, sufficient heat is provided by operating the die under conditions which include heating at least one zone of the die. In one preferred embodiment, the conditions within the die include maintaining the entry zone at a temperature of from about 10° to about 35° C., heating the center zone to a temperature of from about 30° to about 200° C., and maintaining the exit zone at a temperature of from about 0° to about 200° C.

The thermosetting resin matrix also may include an initiator system which cooperates with the conditions of the die to thicken the thermosetting resin matrix by partially curing the thermosetting resin matrix. The initiator system may be present in addition to any of the foregoing thickening agents, or as an alternative thereto.

The initiator system may comprise any number of polymerization initiators. Where multiple polymerization initiators are employed, the initiator system typically comprises polymerization initiators which can be activated by different conditions. For simplicity, where multiple polymerization initiators are employed, we refer to the polymerization initiator requiring the least activation energy as the "first polymerization initiator", and the initiator requiring the most activation energy as the "second polymerization initiator". Any practical number of polymerization initiators having activation energies between the first and second polymerization initiators may also be incorporated into the thermosetting resin matrix. It should not be implied from our use of the terms "first" and "second" polymerization initiator that we restrict our invention to the use of no more than two polymerization initiators.

Polymerization initiators which are useful in the practice of the present invention typically include free-radical initiators. Typical free-radical initiators include peroxy initators. The reactivity of such initiators is evaluated in terms of the 10 hour half-life temperature, that is, the temperature at which the half-life of a peroxide is 10 hours. Suitable first polymerization initiators include polymerization initiators having a low 10 hour half-life, i.e., a more reactive peroxide initiator, as compared to initiators having a higher 10 hour half-life. Suitable second polymerization initiators include polymerization initiators having a higher 10 hour half-life than the 10 hour half-life of the polymerization initiator selected as the first polymerization initiator. Exemplary free-radical initiators useful in the present invention include diacyl peroxides, (e.g., lauroyl peroxide and benzoyl peroxide), dialkylperoxydicarbonates, (e.g., di(4-tert-butylcyclohexyl) peroxy dicarbonate), tert-alkyl peroxyesters, (e.g., t-butyl perbenzoate), di-(tert-alkyl)peroxyketals, (e.g., 1,1-di-(tamylperoxy) cyclohexane), di-tert-alkyl peroxides, (e.g., dicumyl peroxide), azo initiators, (e.g., 2,2'-azobis(isobutyronitrile), ketone peroxides, (e.g., methylethylketone peroxide and hydroperoxides).

In the embodiment wherein the initiator system comprises only one polymerization initiator, the thermosetting resin matrix preferably includes a vinyl monomer. The vinyl monomer and the polymerization initiator may be independently activated under different conditions, thus permitting the partial polymerization of the thermosetting resin matrix.

The amount of polymerization initiator(s) used is dependent upon the number of initiators employed, the conditions at which the selected initiators will initiate polymerization, and the time desired for partial curing. Typically the amount of time desired for partial curing is a short period, i.e., less than 3 hours, and often less than 1 hour. In the embodiment wherein the thermosetting resin matrix includes only one polymerization initiator, the amount of the initiator is typically about 0.1 to about 10 percent by weight of the thermosetting resin matrix. In the embodiment wherein the thermosetting resin matrix includes two polymerization initiators, the amount used is about 0.01 to about 4 percent by weight of the first polymerization initiator and about 0 to about 5 percent by weight of the second polymerization initiator based on the weight of the thermosetting resin matrix.

The initiator system and amounts of each polymerization initiator incorporated into the thermosetting resin matrix should be such that as the resin impregnated reinforcing fiber is pultruded through the die, the conditions therein are sufficient to activate at least one, but preferably not all polymerization initiators, resulting in the partial polymerization of the thermosetting resin matrix. Typically, in the embodiment wherein the initiator system comprises only one polymerization initiator, the resin impregnated reinforcing fiber is pultruded through a die within which the the reinforcing fiber is subjected to sufficient heat to activate the polymerization initiator without attaining the self-polymerization temperature of the matrix.

In the embodiment wherein multiple polymerization initiators are employed, typically the resin impregnated reinforcing fiber is pultruded through a die within which the reinforcing fiber is subjected to sufficient heat to activate at least one, and preferably the first, polymerization initiator to partially cure the thermosetting resin matrix.

The conditions in the die which are sufficient to activate at least one polymerization initiator to partially cure the thermosetting resin will depend on the particular polymerization initiator(s) and the thermosetting resin selected, and will be readily determinable be one skilled in the art. Typically, the conditions within the die which are required for the activation of at least one polymerization initiator comprise subjecting the thermosetting resin matrix to sufficient heat to activate the most reactive, e.g., the first polymerization initiator to partially cure the thermosetting resin matrix. As the prepreg exits the exit zone and is cooled, the polymerization initiated by the activation of the first polymerization initiator is arrested, providing the partially cured prepreg rather than a fully cured article.

Yet another method of thickening the thermosetting resin matrix comprises subjecting the thermosetting resin matrix to sufficient radiation to thicken the matrix. Exemplary forms of radiation include ultraviolet, infrared, radiofrequency waves, microwaves, and electron beams. According to this method, the resin impregnated reinforcing fiber is pultruded through a die within which the resin impregnated reinforcing fiber is subjected to radiation. The wavelength of radiation which is sufficient to thicken the thermosetting resin matrix is dependent upon the form of radiation and the particular thermosetting resin employed, and is readily determinable by one skilled in the art. For example, a thermosetting resin matrix comprising an unsaturated polyester resin or vinyl ester resin solubilized in styrene may be thickened using ultraviolet light having a wavelength ranging from about 200 to about 600 nm.

The conditions within the die which are sufficient to thicken the thermosetting resin matrix typically comprise subjecting the resin impregnated reinforcing fiber to radiation of a sufficient wavelength to thicken the thermosetting resin matrix. Preferably, the radiation source is located at the center zone of the die so that as the resin impregnated reinforcing fiber is passed through the center zone, it is irradiated. In one embodiment, typically the entry zone of the die is maintained at a temperature of from about 10° to about 200° C., the center zone is equipped with a source of radiation operating at a predetermined wavelength, and the exit zone is maintained at a temperature of from about 10° to about 200° C. Alternatively, the radiation source may be located at either the entry or exit zone of the die.

The method of making the prepreg of the present invention comprises (a) impregnating reinforcing fiber with a thermosetting resin matrix, and (b) passing the resin impregnated reinforcing fiber through a die within which the resin impregnated reinforcing fiber is subjected to conditions sufficient to thicken the thermosetting resin matrix, to provide a formable prepreg.

The impregnation of the reinforcing fiber may be accomplished by any suitable means. As described above, conventional pultrusion apparatus typically include a resin bath or resin injection apparatus. In one preferred embodiment, the reinforcing fiber is impregnated by passing the reinforcing fiber through a bath containing the thermosetting resin matrix. Typically, the thermosetting resin matrix is liquid in form and is readily absorbed into the reinforcing fibers as they are passed through the resin bath. In another preferred embodiment, the reinforcing fiber is impregnated by injecting the thermosetting resin matrix onto the reinforcing fiber. Conventional injection pultrusion machines may be employed in the practice of this embodiment.

The thermosetting resin matrix may be thickened using only one of the foregoing methods or by using two or more methods in combination. Any combination of the foregoing thickening methods may be used to prepare the formable prepreg of the present invention. In embodiments wherein multiple methods of thickening the thermosetting resin matrix are employed, the conditions within the die which are sufficient to thicken the thermosetting resin matrix will depend on the particular combination of methods employed. The necessary conditions within the die which will effect thickening will be readily determinable by one skilled in the art.

The rate at which the resin impregnated reinforcing fiber is passed through the die is dependent upon several factors including the thermosetting resin employed, the method of thickening the thermosetting resin matrix, and the conditions within the die, and will be readily determined by one skilled in the art. Typically the resin impregnated reinforcing fiber is passed through the die at a rate of about 1 in/min to about 100 ft/min.

Although the thermosetting resin matrix is effectively thickened by the conditions within the die to form the prepreg of the present invention, in some applications it may be advantageous to initiate some thickening before the resin impregnated reinforcing fiber enters the die. Thickening of the thermosetting resin matrix may be initiated by pretreating the resin impregnated reinforcing fiber according to any suitable method known to those skilled in the art. Suitable methods of pretreating to initiate thickening include subjecting the resin impregnated reinforcing fiber to heat, ultraviolet light, microwaves or radiofrequency waves prior to passing the resin impregnated reinforcing fiber through the die. Pretreating with radiofrequency waves is the preferred method of initiating thickening prior to passing the resin impregnated reinforcing fiber through the die. Although pretreating the resin impregnated reinforcing fiber initiates the thickening process, additional thickening of the thermosetting resin matrix still occurs within the die, by the conditions therein.

The present invention also provides a method of making a molded article having a predetermined shape. The method comprises (a) impregnating reinforcing fiber with a thermosetting resin matrix, (b) passing the resin impregnated reinforcing fiber through a die within which the resin impregnated reinforcing fiber is subjected to conditions sufficient to thicken the thermosetting resin to provide a formable prepreg, and (c) molding the formable prepreg under conditions sufficient to fully cure the thickened thermosetting resin matrix, and to form a molded article having a predetermined shape.

The method of making the molded article having a predetermined shape utilizes the prepreg of the present invention prepared according to the foregoing description of the method. Additionally, the method of making the molded article further comprises the step of molding the formable prepreg under conditions sufficient to fully cure the thickened thermosetting resin. The predetermined shape of the molded article may be enhanced by the addition of selective reinforcements at predetermined locations. Suitable selective reinforcements may be selected from the reinforcing fibers previously mentioned.

Typically, the step of molding the formable prepreg under conditions sufficient to cure the prepreg comprises molding the prepreg under heat and pressure to form a molded article. Preferably, the step of molding the formable prepreg under conditions sufficient to cure the prepreg comprises compression molding the prepreg to form a molded article. Suitable compression molding techniques and parameters for molding the formable prepreg of the present invention will be readily apparent to one skilled in the art. Compression molding transforms the partially cured prepreg to a fully cured article which cannot then be further formed with heating.

The following examples are provided to illustrate the present invention, and should not be construed as limiting thereof. In these examples, ° F. means degrees Fahrenheit, ° C. means degrees Centigrade, in. means inches, ft means feet, $ft^2$ means square feet, oz means ounces, and min means minutes.

EXAMPLE 1

Preparation of Prepreg

A conventional wet-bath pultrusion apparatus having a 0.5 inch die opening was equipped with roving strung between guides, through the resin bath, through the die, and secured to the pulling mechanism. The resin bath was charged with 100 parts DION™ 31022-00, 0.1 parts di-(4-tert-butylcyclohexyl) peroxy dicarbonate, 0.1 parts styrene monomer, 1.0 part t-butylperbenzoate, 3.5 parts zinc stearate internal mold release agent and 50 parts calcium carbonate filler. The entry zone of the die was chilled using cooling water, while the center zone was heated to 280° F., and the exit zone was heated to 300° F. The roving was pultruded at several different rates to produce prepreg with varying properties. Roving pultruded at 9 in/min. produced a firm rod which could be cut with scissors. Roving pultruded at either 12 in/min. or 18 in/min. produced a semi-dry, loose, non-tacky bundle of roving, which was easy to bend.

EXAMPLE 2

Post-Forming by Compression Molding

The loose prepreg of Example 1, was manually bent 360 degrees. The charge was then placed into the mold cavity of a compression molding device. The upper mold was heated to 145° C. while the lower mold was heated to 148° C. Thereafter, the mold was closed and 1020 psi of pressure was applied for 3 min. The fully cured part was rigid and could not be deformed without damage.

EXAMPLE 3

Post-Forming by Compression Molding

Four-12 in sections of the firm rod prepreg of Example 1 was positioned in a flat mold cavity in a conventional compression molding device. The upper mold was heated to 145° C. while the lower mold was heated to 148° C. Thereafter, the mold was closed and 100 tons of pressure was applied for 3 min. The fully cured part assumed the shape of the mold cavity.

EXAMPLE 4

Preparation of Prepreg

A conventional wet-bath pultrusion apparatus having an 8 in.×0.15 in. profile die opening was strung with an 8 in top layer of 1.5 oz/$ft^2$ continuous strand mat, 75 glass rovings spread over 8 in, and an 8 in bottom layer of 1.5 oz/$ft^2$ continuous strand mat. The reinforcing layers were strung through guides, the resin bath, and the die, and then secured to the pulling mechanism. The resin bath was charged with 100 parts ATLAC™ 580-05, 0.35 parts di-(4-tert-butylcyclohexyl) peroxy dicarbonate, 0.35 parts peroxy 2-ethylhexanoate, 0.35 parts t-butylperbenzoate, 0.35 parts PS-125™ liquid internal mold release agent and 30 parts calcium carbonate filler. The entry zone of the die was chilled using cooling water, while the center zone was heated to 250° F., and the exit zone was heated to 275° F. The reinforcing layers were pultruded at 18 in/min. to produce a flexible, non-tacky 8 in. sheet of prepreg which could easily be cut with scissors.

EXAMPLE 5

Post-Forming by Compression Molding

The prepreg of Example 4 was post-formed in a compression molding apparatus. A 12 in. piece was placed in a 14 in.×14 in. flat mold cavity of a conventional compression molding device. The upper mold was heated to 145° C., while the lower mold was heated to 148° C. Thereafter, the mold was closed and 100 tons of pressure was applied for 3 min. The fully cured part was smooth and glossy, indicating that the prepreg spread under pressure carrying the glass fibers together with the resin matrix.

The foregoing is illustrative of the present invention and is not to be construed as limiting thereof. The invention is defined by the following claims, with equivalents of the claims to be included therein.

That which is claimed is:

1. A method of making a formable prepreg comprising:
   (a) impregnating reinforcing fiber with a thermosetting resin matrix comprising a thermosetting resin selected from the group consisting of unsaturated polyester, phenolic and vinyl ester resins; and
   (b) passing the resin impregnated reinforcing fiber through a die within which the resin impregnated reinforcing fiber is subjected to conditions sufficient to thicken the thermosetting resin matrix to a B-stage, to provide a formable prepreg.

2. The method according to claim 1, wherein step (a) of impregnating reinforcing fiber with a thermosetting resin matrix comprises passing the reinforcing fiber through a bath containing the thermosetting resin matrix.

3. The method according to claim 1, wherein step (a) of impregnating reinforcing fiber with a thermosetting resin matrix comprises injecting the thermosetting resin matrix into the reinforcing fiber.

4. The method according to claim 1, wherein the thermosetting resin matrix includes a thermosetting resin selected from the group consisting of unsaturated polyester resins, and vinyl ester resins, which is solubilized in a vinyl monomer, and step (a) of impregnating reinforcing fiber with a thermosetting resin matrix comprises passing the reinforcing fiber through a bath containing the thermosetting resin matrix.

5. The method according to claim 1, wherein the thermosetting resin matrix includes a thermosetting resin selected from the group consisting of unsaturated polyester resins, and vinyl ester resins, which is solubilized in a vinyl monomer, and step (a) of impregnating reinforcing fiber with a thermosetting resin matrix comprises injecting the thermosetting resin matrix into the reinforcing fiber.

6. The method according to claim 1, wherein the thermosetting resin matrix includes a thickening agent selected from the group consisting of crystalline unsaturated polyesters, polyurethanes, alkali earth metal oxides or hydroxides, and polyureas, and the conditions sufficient to thicken the thermosetting resin matrix of step (b), comprise subjecting the resin impregnated reinforcing fiber to sufficient heat to thicken the thermosetting resin matrix.

7. The method according to claim 1, wherein the conditions sufficient to thicken the thermosetting resin matrix of step (b), comprise subjecting the impregnated reinforcing fiber to radiation of sufficient wavelength to thicken the thermosetting resin matrix.

8. The method according to claim 1, wherein the thermosetting resin matrix further comprises a polymerization initiator system including at least one polymerization initiator, and the conditions sufficient to thicken the thermosetting resin matrix of step (b), comprise subjecting the thermosetting resin matrix to conditions sufficient to activate at least one polymerization initiator to partially cure the thermosetting resin matrix.

9. The method according to claim 1, wherein the die comprises an entry zone, a center zone and an exit zone at least one of which is capable of being heated.

10. A method of making a formable prepreg comprising:
    (a) impregnating reinforcing fiber with a thermosetting resin matrix comprising an unsaturated polyester resin and a thickening agent selected from the group consisting of crystalline unsaturated polyesters, polyurethanes, alkali earth metal oxides or hydroxides, and polyureas; and
    (b) passing the resin impregnated reinforcing fiber through a die within which the resin impregnated reinforcing fiber is subjected to conditions sufficient to thicken the thermosetting resin matrix to a B-stage, to provide a formable prepreg.

11. The method according to claim 10, wherein step (a) of impregnating reinforcing fiber with a thermosetting resin matrix comprises passing the reinforcing fiber through a bath containing the thermosetting resin matrix.

12. The method according to claim 10, wherein step (a) of impregnating reinforcing fiber with a thermosetting resin matrix comprises injecting the thermosetting resin matrix into the reinforcing fiber.

13. The method according to claim 10, wherein the thermosetting resin matrix includes an unsaturated polyester resin solubilized in a vinyl monomer, and step (a) of impregnating reinforcing fiber with a thermosetting resin matrix comprises passing the reinforcing fiber through a bath containing the thermosetting resin matrix.

14. The method according to claim 10, wherein the thermosetting resin matrix includes an unsaturated polyester resin solubilized in a vinyl monomer, and step (a) of impregnating reinforcing fiber with a thermosetting resin matrix comprises injecting the thermosetting resin matrix into the reinforcing fiber.

15. The method according to claim 10, wherein the conditions sufficient to thicken the thermosetting resin matrix of step (b), comprise subjecting the resin impregnated reinforcing fiber to sufficient heat to thicken the thermosetting resin matrix.

16. The method according to claim 10, wherein the conditions sufficient to thicken the thermosetting resin matrix of step (b), comprise subjecting the impregnated reinforcing fiber to radiation of sufficient wavelength to thicken the thermosetting resin matrix.

17. The method according to claim 10, wherein the thermosetting resin matrix further comprises a polymerization initiator system including at least one polymerization initiator, and the conditions sufficient to thicken the thermosetting resin matrix of step (b), comprise subjecting the thermosetting resin matrix to conditions sufficient to activate at least one polymerization initiator to partially cure the thermosetting resin matrix.

18. The method according to claim 10, wherein the die comprises an entry zone, a center zone and an exit zone at least one of which is capable of being heated.

19. A method of making a molded article having a predetermined shape, said method comprising:
(a) impregnating reinforcing fiber with a thermosetting resin matrix comprising a thermosetting resin selected from the group consisting of unsaturated polyester, phenolic and vinyl ester resins, to provide resin impregnated reinforcing fiber;
(b) passing the resin impregnated reinforcing fiber through a die within which the resin impregnated reinforcing fiber is subjected to conditions sufficient to thicken the thermosetting resin matrix to a B-stage, to provide a formable prepreg; and
(c) molding the formable prepreg under conditions sufficient to cure the B-staged thermosetting resin, to form a molded article having a predetermined shape.

20. The method according to claim 19, wherein step (a) of impregnating reinforcing fiber with a thermosetting resin matrix comprises passing the reinforcing fiber through a bath containing the thermosetting resin matrix.

21. The method according to claim 19, wherein step (a) of impregnating reinforcing fiber with a thermosetting resin matrix comprises injecting the thermosetting resin matrix into the reinforcing fiber.

22. The method according to claim 19, wherein the thermosetting resin matrix includes a thickening agent selected from the group consisting of crystalline unsaturated polyesters, polyurethanes, alkali earth metal oxides or hydroxides, and polyureas, and the conditions sufficient to thicken the thermosetting resin matrix of step (b), comprise subjecting the resin impregnated reinforcing fiber to sufficient heat to thicken the thermosetting resin matrix.

23. The method according to claim 19, wherein the conditions sufficient to thicken the thermosetting resin matrix of step (b), comprises subjecting the resin impregnated reinforcing fiber to radiation of a sufficient wavelength to thicken the thermosetting resin matrix.

24. The method according to claim 19, wherein the thermosetting resin matrix further comprises a polymerization initiator system including at least one polymerization initiator, and the conditions sufficient to thicken the thermosetting resin matrix of step (b), comprise subjecting the thermosetting resin matrix to conditions sufficient to activate at least one polymerization initiator to partially cure the thermosetting resin matrix.

25. The method according to claim 19, wherein the die comprises an entry zone, a center zone and an exit zone at least one of which is capable of being heated.

26. The method according to claim 19, further comprising positioning selected reinforcements at predetermined locations on the formable prepreg prior to the step (c) of molding the formable prepreg.

27. The method according to claim 19, wherein the step (c) of molding the formable prepreg under conditions sufficient to cure the prepreg comprises molding the prepreg under heat and pressure to form a molded article.

28. The method according to claim 19, wherein the step of molding the formable prepreg under conditions sufficient to cure the prepreg comprises compression molding the prepreg to form a molded article.

29. A method of making a formable prepreg, said method comprising pultrusion reinforcing fiber impregnated with a thermosetting resin matrix through a die, wherein said thermosetting resin matrix comprises a thermosetting resin selected from the group consisting of unsaturated polyester, and vinyl ester resins, solubilized in a vinyl monomer, and a polymerization initiator system including at least one polymerization initiator, and wherein the resin impregnated reinforcing fiber is subjected to conditions within the die which are sufficient to activate at least one polymerization initiator to partially cure the thermosetting resin matrix to a B-stage, to provide a formable prepreg.

* * * * *